United States Patent [19]

Rogers

[11] Patent Number: 4,561,465
[45] Date of Patent: Dec. 31, 1985

[54] AXIAL FLOW PRESSURE REGULATOR

[75] Inventor: Russell L. Rogers, Munith, Mich.

[73] Assignee: Aeroquip Corporation, Jackson, Mich.

[21] Appl. No.: 529,273

[22] Filed: Sep. 6, 1983

[51] Int. Cl.⁴ ............................................. F16L 37/28
[52] U.S. Cl. ............................ 137/614.05; 137/505.25; 137/614.03; 137/614.04
[58] Field of Search ................. 137/505.25, 614.04, 137/614.05, 614.03; 251/149.6

[56] References Cited

U.S. PATENT DOCUMENTS

| | | | |
|---|---|---|---|
| 3,435,843 | 4/1969 | Spencer | 137/505.25 |
| 3,437,109 | 4/1969 | Carlson et al. | 137/505.25 |
| 3,645,294 | 2/1972 | Allread | 137/614.04 |
| 3,890,999 | 6/1975 | Moskow | 137/505.25 |
| 4,287,914 | 9/1981 | Buseth et al. | 137/614.03 |
| 4,398,561 | 8/1983 | Maldars | 137/614.05 |

Primary Examiner—A. Michael Chambers
Attorney, Agent, or Firm—Beaman & Beaman

[57] ABSTRACT

An in-line axial flow nonrestrictive fluid pressure regulator utilizing a tubular valve axially displaceable within a flow passage. The valve is positioned with respect to a valve seat to control fluid flow and pressure by means of differential area pressure faces defined thereon. Damping of the valve movement to minimize "hunting" is achieved by dashpot structure interposed between the valve and regulator body.

6 Claims, 5 Drawing Figures

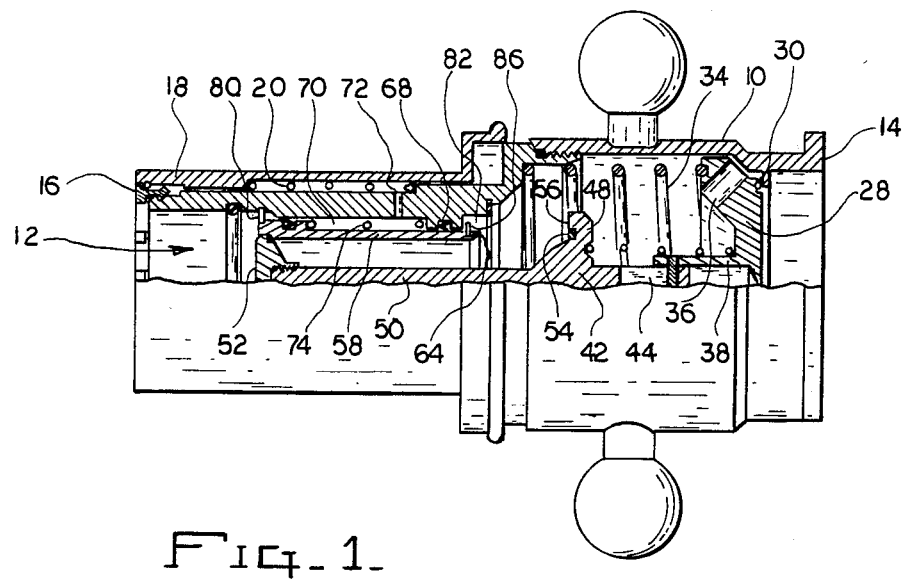
Fig_1_
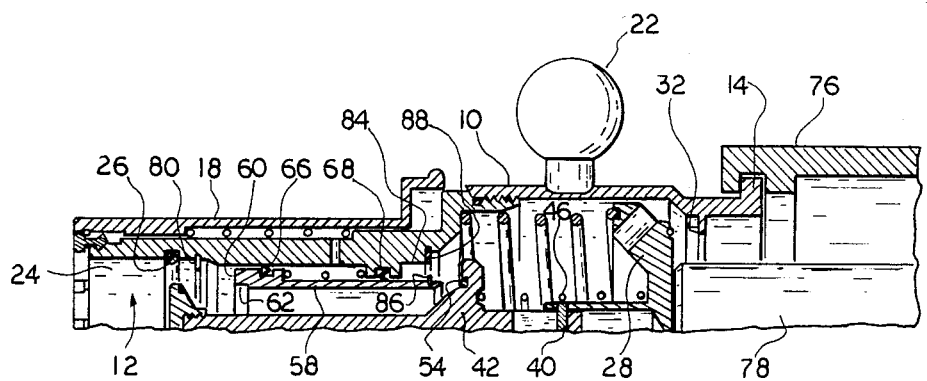
Fig_2_
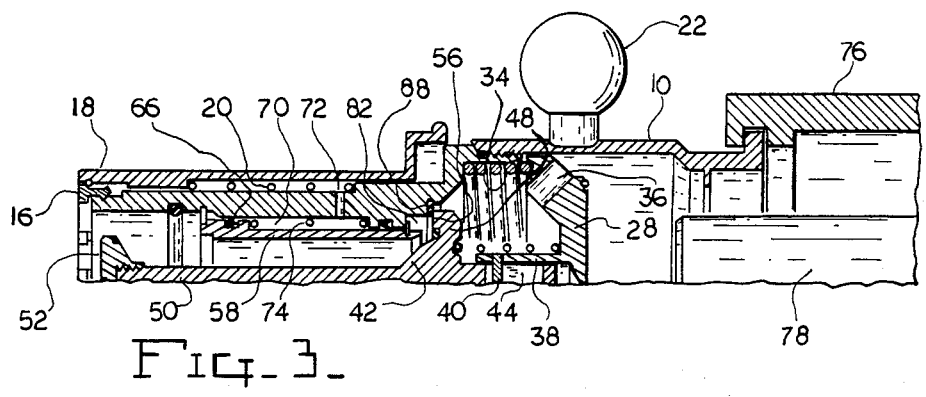
Fig_3_

AXIAL FLOW PRESSURE REGULATOR

BACKGROUND OF THE INVENTION

The regulation of pressure within fluid systems is accomplished by pressure regulators which are usually spring biased and often utilize differential pressure faces to position a valve relative to an orifice or seat for fluid flow control, and hence pressure control. Such pressure regulators usually are constructed such that this fluid flow is severely restricted through the regulator, the flow path often taking a 90° deflection. Conventional pressure regulators are often bulky and require considerable space and clearance, and are not readily incorporated into flexible hose line systems.

It is an object of the invention to provide an axial flow pressure regulator which can be readily incorporated into flexible hose line systems without significantly adding to the bulk of such systems.

Another object of the invention is to provide a pressure regulator capable of accurately regulating fluid pressure within a conduit, yet which does not significantly restrict the fluid flow other than to regulate the pressure.

An additional object of the invention is to provide an axial flow pressure regulator which may be readily incorporated into aircraft refueling coupling and nozzle systems.

Yet a further object of the invention is to provide a pressure regulator of a concise and convenient configuration having an exterior form complementary to the adjacent fluid system components.

A further object of the invention is to provide an axial flow pressure regulator utilizing a dashpot damper of economical form which minimizes control valve vibration and hunting.

Another object of the invention is to provide an axial flow pressure regulator for a pressurized fluid system which will automatically terminate fluid flow in the event of an excessive flow rate.

In the practice of the invention a spring biased tubular valve is mounted within the fluid flow passage of a body for axial displacement therein. One end of the valve is in axial alignment with a valve seat, and differential pressure faces defined upon the valve control the axial position of the valve relative to the seat to control fluid flow and pressure. The exterior surface of the valve is vented to the atmosphere to assure consistent differential pressure operational characteristics.

To minimize valve "hunting" a dashpot damper is interposed between the valve and body consisting of a variable volume chamber either defined upon the body or valve used in conjunction with an annular fluid flow regulator through which the chamber communicates with the pressurized fluid. Thus, ingress or egress of fluid within the chamber is restricted thereby damping the valve against rapid vibrational displacement.

An embodiment of the pressure regulator of the invention is disclosed wherein the regulator body may be used in conjunction with a standard military aircraft refueling nozzle, and the regulating valve seat is movably mounted in such a manner that excessive fluid flow through the regulator axially displaces the valve seat structure to seal the body to prevent further fluid flow.

BRIEF DESCRIPTION OF THE DRAWINGS

The aforementioned objects and advantages of the invention will be appreciated from the following description and accompanying drawings wherein:

FIG. 1 is an elevational view, partially in diametrical section, illustrating a pressure regulator in accord with the invention, the valve components being shown in a normal, inactive condition, FIG. 2 is an elevational sectional view of the regulator of FIG. 1 as connected to a valve fitting, illustrating the valve in an operative condition, FIG. 3 is an elevational sectional view similar to FIG. 2 illustrating the valve seat structure in a displaced closed condition under excessive fluid flow conditions.

DESCRIPTION OF THE PREFERRED EMBODIMENTS

Figure 4:
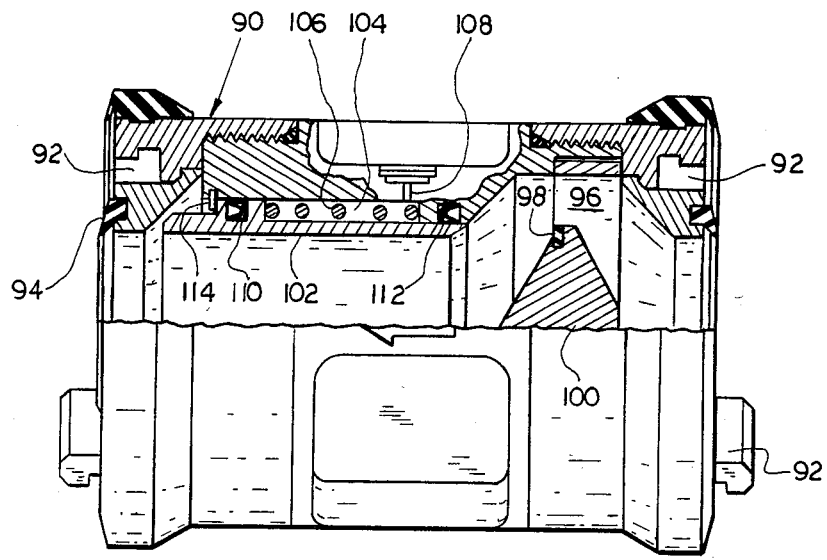
FIG. 4 is an elevational, partially diametrically sectioned view of another embodiment of axial fluid pressure regulator in accord with the invention in an inoperative non-use condition.

The axial flow pressure regulator concepts of the invention may be utilized within a broad range of fluid conduit system fittings, and in the drawings two such fittings are illustrated. In FIGS. 1-3, the concepts of the invention are incorporated in an adapter nozzle used for refueling aircraft, and this nozzle is designed for use with a standard D-1 military refueling nozzle identified as Mil-N-5877C.

The adapter body 10 is of a tubular configuration including a passage 12 intersecting one end upon which radially extending bayonet type connection projections 14 are defined for attaching the adapter to a standard D-1 nozzle. The other end of the adapter body includes a plurality of pivoted fingers 16 mounted thereon pivotal between radially retracted positions as shown in FIG. 1, to an inwardly extending position by an actuator sleeve 18 biased toward the left by compression spring 20. The sleeve 18 may be manually displaced to the right, which retracts and releases the fingers 16, and under operating conditions the spring 20 will axially displace the sleeve to the left which cams the fingers inwardly whereby the adapter may be locked to an aircraft fuel inlet, not shown. Externally, the adapter is provided with a plurality of radially extending knobs 22 permitting the adapter to be quickly attached to the refueling nozzle. When the adapter body 10 is attached to the aircraft inlet the cylindrical inlet will be received within the passage cylindrical portion 24 and sealed thereto by O-ring 26.

The passage 12 is sealed adjacent the right end by a plug 28 which includes an O-ring 30 engaging the radial seat 32, and a compression spring 34 biases the plug toward the right for normally engaging the seal and seat to prevent foreign matter from entering the body passage. The plug includes a plurality of ports 36 through which fluid may flow upon the plug being displaced to the left from the position shown in FIG. 1.

The plug 28 includes a hub 38 of tubular configuration and a diametrically disposed pin 40 extends across the hub recess.

A valve seat core member 42 is centrally located within the passage 12 and is maintained and located therein by the plug 28. The member 42 includes an elongated slot 44 through which the pin 40 extends, and compression spring 46 interposed between the plug 28 and the annular radial projection 48 biases the member 42 toward the left normally maintaining the pin 40 against the right end of the slot 44 to support the member within the passage. The member 42 includes an elongated neck 50 upon which a head 52 is threaded, and the radial projection 48 includes an annular elastomeric valve seat 54 and a radially extending sealing surface 56.

Pressure regulation is achieved by the axially displaceable tubular valve 58 located within passage 12 in radial alignment with the core neck 50. The internal diameter of the valve is sufficently spaced from the neck as to not significantly restrict fluid flow through the adapter body, and the valve includes an outer end 60 having a countersunk sealing surface 62 while the inner end 64 includes a shaped configuration adapted to sealingly engage the axially aligned seat 54 defined upon the core member projection 48.

Externally, the valve 58 is provided with a maximum diameter adjacent outer end 60 in which the annular lip seal 66 is located for sealing the valve to the body passage 12, and the body passage includes a cylindrical face of lesser diameter in which the lip seal 68 is located and sealingly engages the outer surface of the valve 58.

The valve configuration defines an annular chamber 70 between seals 66 and 68 which is vented to the atmosphere at 72, and compression spring 74 exerts a biasing force on the valve 58 toward the left, FIG. 1.

The normal unattached state of the adapter components will be as shown in FIG. 1. The plug 28 will engage the body seat 32 under the influence of spring 34 preventing foreign matter from entering the right end of the adapter, while the spring 74 will bias the valve 58 toward the left engaging the valve surface 62 with the core member head 52 closing the left end of the adapter against the entrance of foreign matter.

Upon attaching the adapter body to the standard D-1 refueling nozzle 76 by means of projections 14 the nozzle spider 78 will displace the plug 28 to the left unseating the plug from seat 32, and causing the core member 42 to shift to the left, FIG. 2, in that the core member is axially positioned within the body by the plug. Snap ring 80 mounted within the body passage 12 restricts the valve 58 against movement toward the left, and the leftward movement of the core member 42, FIG. 2, will unseat the valve from the head 52, and as the plug ports 36 are now in communication with the D-1 nozzle, fluid can flow through the adapter as soon as the adapter is attached to the fuel inlet by fingers 16 and the valve in the D-1 nozzle is opened.

As fluid flow through the passage 12 occurs the pressure within the adapter will act upon the left end 60 of the valve 58, and also act upon the right end 64 of the valve. As the effective radial pressure faces of the valve at each end differ, the pressure face at the valve end 60 being larger than at the right end 64, internal fluid pressure within the passage tends to bias the valve toward the right in a direction toward the valve seat 48. The area ratio of pressure faces and the biasing force produced by spring 74 are so predetermined that the operating clearance between the valve end 64 and the valve seat 54 will maintain the desired fluid pressure within the adapter, and if the pressure is reduced, the valve will move to the left increasing the volume of flow and the internal pressure, while increases in internal pressure cause the valve to move toward the right closing the valve gap and reducing the internal pressure. Thus, it will be appreciated that a fully automatic pressure regulation is achieved.

In order to prevent "hunting" of the valve 58 during operation, the valve is damped by dashpot structure incorporated into the components. In FIG. 1 the dashpot structure includes a chamber 82 formed in the body 10 by cylindrical surface 84, and a valve mounted snap ring 86 mounted adjacent the valve end 64 radially extends into the chamber 82 whereby a small clearance exists between the periphery of the ring 86 and the surface 84. This annular clearance defines a damping orifice establishing communication between the chamber and the internal fluid pressure such that the resistance to fluid flow over the ring damps valve movement and produces a smooth valve operation during pressure regulation.

To disconnect the adapter from the D-1 nozzle 76 the nozzle valve is first closed, and the adapter may then be rotated by the knobs 22 to release the adapter from the nozzle. Upon being released, the spring 34 will bias the plug to the condition of FIG. 1, and after the fingers 16 are released from the inlet by sleeve 18 the components will return to the relationship of FIG. 1 wherein the body 10 is sealed at each end.

If, inadvertently, the operator should actuate the sleeve 18 to release the adapter from the fuel tank inlet prior to closing the nozzle 76, the adapter will automatically close. This operation occurs due to the fact that a high volume of unrestricted fluid flow against the plug 28 will cause the spring 34 to compress shifting the plug to the left, FIG. 3, which, likewise, causes the core member 42 to move to the left. Such movement of the plug and core member will occur until the projection seal surface 56 engages the annular valve seat surface 88 defined in the body member passage, and upon such engagement occurring the body passage will be blocked to further fluid flow therethrough. The "lost motion" interconnection between the core member 42 and the plug 28 resulting from the relationship of the pin 40 and elongated slot 44 permits the aforementioned relationships to occur without overstressing, or requiring accurate tolerances, and once the primary nozzle refueling valve has been closed the spring 34 will return the plug, and core member to the position of FIG. 1.

From the above it will be appreciated that an axial flow regulator is produced which accurately controls fluid pressures without adversely affecting the flow characteristics through the fitting, and the apparatus also serves as an emergency closing valve to prevent accidental fuel loss.

Figure 5:
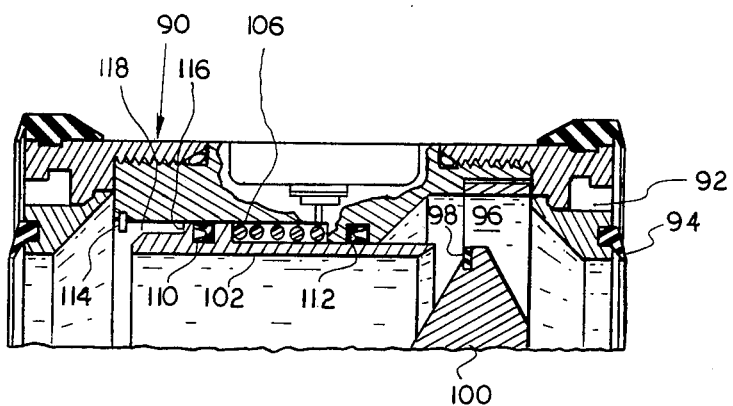
FIG. 5 is a detailed, elevational, sectional view of the embodiment of FIG. 4 illustrating the valve component in an operative condition.

A variation of a fluid conduit system fitting incorporating the concepts of the invention is shown in FIGS. 4 and 5. In this embodiment the fitting includes a substantially cylindrical body 90 having identical ends wherein axially extending bayonet connections 92 permit the body to be quickly attached "in-line" to complementary fittings, and the annular flat-face lip seals 94 will seal the fitting to the associated conduit system components, not shown. The body 90 includes a passage 96, and a valve seat 98 is centrally located within the passage and fixedly maintained therein by spider structure 100. The valve seat includes an annular elastomeric seal.

A tubular valve 102 is located within the passage 96, and includes an external surface chamber 104 receiving compression spring 106, the chamber being vented to the atmosphere at 108. Seal 110 seals the valve to the passage surface, while body mounted elastomer seal 112 seals the valve at the reduced diameter of the body passage. As in the previously described embodiment, the diameter of the valve at seal 110 is greater than that at seal 112 producing a greater internal pressure face at the left end of the valve, than at the right end thereof. The right end of the valve 102 is shaped to define an annular edge in axial alignment with the valve seat 98.

Movement of the valve 102 to the left is restricted by snap ring 114 engaging the radial abutment surface 116 defined on the valve. The abutment surface 116, and the passage and valve define a dashpot damping chamber 118 receiving the ring 114, and the radial clearance between the innermost edge of the ring and the valve produces an orifice of limited cross sectional area capable of damping the valve movement during operation.

In use, the body 90 is attached in-line to the fluid circuit desired, and pressurizing the passage 96 will subject both ends of the valve 102 to fluid pressure. As predetermined by the area ratio of the valve end pressure surfaces, and the biasing force produced by spring 106, the valve 102 will relate itself to the valve seat 98 to produce that fluid flow through the body which produces the desired pressure therein. As the pressure increases the valve will move toward the right closing the gap between the valve end and valve seat, while a decrease in pressure permits the spring 106 to force the valve toward the left, to open the flow gap.

It will be appreciated that various modifications to the inventive concepts may be apparent to those skilled in the art without departing from the spirit and scope of the invention.

I claim:

1. An axial flow pressure regulator comprising, in combination, an annular body having an axial flow passage defined therein, a tubular valve movably supported within said passage for axial movement therein in valve opening and valve closing directions, said valve including an exterior surface, first and second pressure faces in axially opposed relationship and an annular gate surface, axially spaced seals sealing the valve exterior surface from said body passage, biasing means biasing said valve in said valve opening direction, said first pressure face having a greater area than said second pressure face and being in opposed relationship to the direction of the force applied by said biasing means whereby fluid pressure within said passage tends to displace said valve in the valve closing direction, first dashpot means defined upon said tubular valve operatively associated with second dashpot means defined upon said body damping movement of said tubular valve within said body, and a valve seat within said body in axial alignment with said gate surface engageable by said gate surface upon said valve moving its maximum extent in said valve closing direction.

2. In an axial flow pressure regulator as in claim 1, said second pressure face comprising an end of said tubular valve.

3. In an axial flow pressure regulator as in claim 2, said gate surface being defined upon said end of said tubular valve.

4. In an axial flow pressure regulator as in claim 1, an annular chamber defined about said tubular valve partially defined by said valve exterior surface, said biasing means comprising a compression spring located within said chamber, and a vent passage defined in said body in communication with said chamber venting said chamber to the atmosphere.

5. In an axial flow pressure regulator as in claim 1, said first and second dashpot means comprising a chamber varying in volume as the tubular valve is translated within the body passage and in communication with the body passage, and flow control means restricting flow into said chamber as the chamber varies in volume.

6. An axial flow pressure regulator comprising, in combination, an annular body having an axial flow passage defined therein, a tubular valve movably supported within said passage for axial movement therein in valve opening and valve closing directions, said valve including an exterior surface, first and second pressure faces in axially opposed relationship and an annular gate surface, axially spaced seals sealing the valve exterior surface from said body passage, biasing means biasing said valve in said valve opening direction, said first pressure face having a greater area than said second pressure face and being in opposed relationship to the direction of the force applied by said biasing means whereby fluid pressure within said passage tends to displace said valve in the valve closing direction, a valve seat within said body in axial alignment with said gate surface engagable by said gate surface upon said valve moving its maximum extent in said valve closing direction, a spider within said body passage, said valve seat being defined on said spider, means mounting said spider within said body for axial movement therein, a spring within said body axially biasing said spider against the direction of flow within said passage, flow resistance means within said passage operatively connected to said spider exposed to fluid flow therein, a second valve seat defined on said body concentric to said spider and axially spaced from said spider, and a valve surface defined upon said spider engagable with said second valve seat upon said flow resistance means axially displacing said spider in the direction of fluid flow due to a sufficient rate of fluid flow to overcome the biasing force of said spring.

* * * * *